United States Patent
Huang (10) Patent No.: US 10,033,492 B2
(45) Date of Patent: Jul. 24, 2018

(54) DYNAMIC CARRIER ASSIGNMENT OF CARRIER AGGREGATION IN AN LTE-ADVANCED SYSTEM

(71) Applicant: EMPIRE TECHNOLOGY DEVELOPMENT LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 100 days.

(21) Appl. No.: 15/060,993

(22) Filed: Mar. 4, 2016

(65) Prior Publication Data

US 2016/0192384 A1 Jun. 30, 2016

Related U.S. Application Data

(62) Division of application No. 14/006,309, filed as application No. PCT/CN2012/082859 on Oct. 12, 2012, now Pat. No. 9,320,041.

(51) Int. Cl.
*H04L 5/00* (2006.01)
*H04W 72/04* (2009.01)
*H04W 72/12* (2009.01)

(52) U.S. Cl.
CPC ............ *H04L 5/001* (2013.01); *H04L 5/0085* (2013.01); *H04L 5/0087* (2013.01);
(Continued)

(58) Field of Classification Search
CPC ......... H04W 72/1263; H04W 72/1226; H04W 72/0453; H04W 72/1252; H04W 72/0486;
(Continued)

(56) References Cited

U.S. PATENT DOCUMENTS

2010/0150082 A1  6/2010  Shin et al.
2011/0242972 A1  10/2011  Sebire et al.
(Continued)

FOREIGN PATENT DOCUMENTS

| CN | 102215551 A | 10/2011 |
|---|---|---|
| EP | 2323304 A2 | 5/2011 |
| WO | 2012008691 A2 | 1/2012 |

OTHER PUBLICATIONS

Nokia Corporation, Nokia Siemens Networks; Activation/Deactivation of SCells; 3GPP TSG-RAN WG2 Meeting #70bis Stockholm, Sweden, Jun. 28-Jul. 2, 2010. R2-103535.*

(Continued)

Primary Examiner — Gary Mui
(74) Attorney, Agent, or Firm — IP Spring (57) ABSTRACT

Various embodiments of a scheme of dynamic activation and release of carrier aggregation in an LTE-Advanced system are provided. When transmission need of an LTE-Advanced user is large and the user is within coverage of at least one secondary component carrier, carrier aggregation is activated while a certain amount of resource of each component carrier is preserved to support carrier aggregation. This avoids unnecessary activation and waste due to signaling cost. When the primary component carrier of an LTE-Advanced user has sufficient resource to satisfy transmission need of the user or when the user is not within coverage of at least one secondary component carrier, carrier aggregation is released. This minimizes complex measurement and cost of controlling signals due to multi-carrier scheduling.

16 Claims, 8 Drawing Sheets

(52) U.S. Cl.
CPC ... *H04W 72/0453* (2013.01); *H04W 72/0486* (2013.01); *H04W 72/1226* (2013.01); *H04W 72/1252* (2013.01); *H04W 72/1263* (2013.01); *H04L 5/0044* (2013.01); *H04L 5/0064* (2013.01)

(58) Field of Classification Search
CPC .. H04W 5/001; H04W 5/0085; H04W 5/0087
See application file for complete search history.

(56) References Cited

U.S. PATENT DOCUMENTS

| | | | | |
|---|---|---|---|---|
| 2011/0243106 | A1* | 10/2011 | Hsu | H04L 5/0096 370/336 |
| 2013/0039202 | A1 | 2/2013 | Feuersanger et al. | |
| 2013/0148588 | A1 | 6/2013 | Comeau et al. | |
| 2013/0176981 | A1* | 7/2013 | Earnshaw | H04L 1/02 370/329 |
| 2013/0242777 | A1* | 9/2013 | Choi | H04W 72/0446 370/252 |
| 2013/0343261 | A1* | 12/2013 | Gonsa | H04B 7/2606 370/315 |
| 2014/0119339 | A1 | 5/2014 | Yang et al. | |

OTHER PUBLICATIONS

Nokia Corporation, Nokia Siemens Networks; Uplink Activation & Deactivation of SCells; 3GPP TSG-RAN WG2 Meeting #70bis; Stockholm, Sweden, Jun. 28-Jul. 2, 2010; R2-103536.*

NTT Docomo, Inc; UL SCell activation/deactivation; 3GPP TSG-RAN2#70bis; Jun. 28-Jul. 2, 2010 Stockholm, Sweden; R2-103963.*

International Search Report with Written Opinion for International Application No. PCT/CN2012/082859 dated Jul. 18, 2103.

3rd Generation Partnership Project; Technical Specification Group Radio Access Network; Evolved Universal Terrestrial Radio Access (E-UTRA); Carrier Aggregation; Base Station (BS) radio transmission and reception (Release 10), 3GPP TR 36.808 V10.1.0, Technical Report, pp. 1-31 (Jul. 8, 2013).

Iwamura, M., et al., "Carrier Aggregation Framework in 3GPP LTE-Advanced" IEEE Communications Magazine, vol. 48, Issue 8, pp. 60-67 (Aug. 2010).

Yingmin, W., et al., "TD-LTE Principles and System Design," People Post Press Pub, pp. 435-443 (Jun. 2010).

* cited by examiner

DYNAMIC CARRIER ASSIGNMENT OF CARRIER AGGREGATION IN AN LTE-ADVANCED SYSTEM

CROSS-REFERENCE TO RELATED APPLICATIONS

This application is a Divisional application under 35 U.S.C. § 121 of and claims priority under 35 U.S.C. § 120 to U.S. patent application Ser. No. 14/006,309, filed on Sep. 19, 2013, now U.S. Pat. No. 9,320,041, which is a U.S. National Stage filing under 35 U.S.C. § 371 of International Application No. PCT/CN2012/082859, filed on Oct. 12, 2012. The disclosures of U.S. patent application Ser. No. 14/006,309 and International Application No. PCT/CN2012/082859 are hereby incorporated herein by reference in their entireties.

BACKGROUND

The Long Term Evolution Advanced standard, also known as LTE Advanced, LTE-Advanced or LTE-A, is a mobile communication standard adopted by the $3^{rd}$ Generation Partnership Project (3GPP) as a major enhancement of the LTE standard. In an LTE-Advanced system, carrier aggregation technology is one of the key technologies that increase system/link capacity. Carrier aggregation requires that users capable of communications based on the LTE-Advanced standard transmit signals on multiple component carriers while maintaining compatibility with systems based on the LTE standard. Hereafter, the terms "user", "user equipment" and "communication device" may be used interchangeably.

For a given LTE-Advanced user, the user initially transmission a primary component carrier (PCC) until carrier aggregation is activated, at which time the user transmits data packages on multiple component carriers including the PCC and one or more secondary component carriers (SCCs). When an LTE-Advanced user is in an idle state, the user transmits on the component carrier of the best channel condition, which is typically the PCC. The user monitors system information on the PCC before carrier aggregation is activated. For LTE-Advanced users, all of the component carriers utilized by the user are SCCs except for the PCC. The user schedules transmission of data packets on both the PCC and one or more SCCs after carrier aggregation is activated until carrier aggregation is released.

Figure 8:
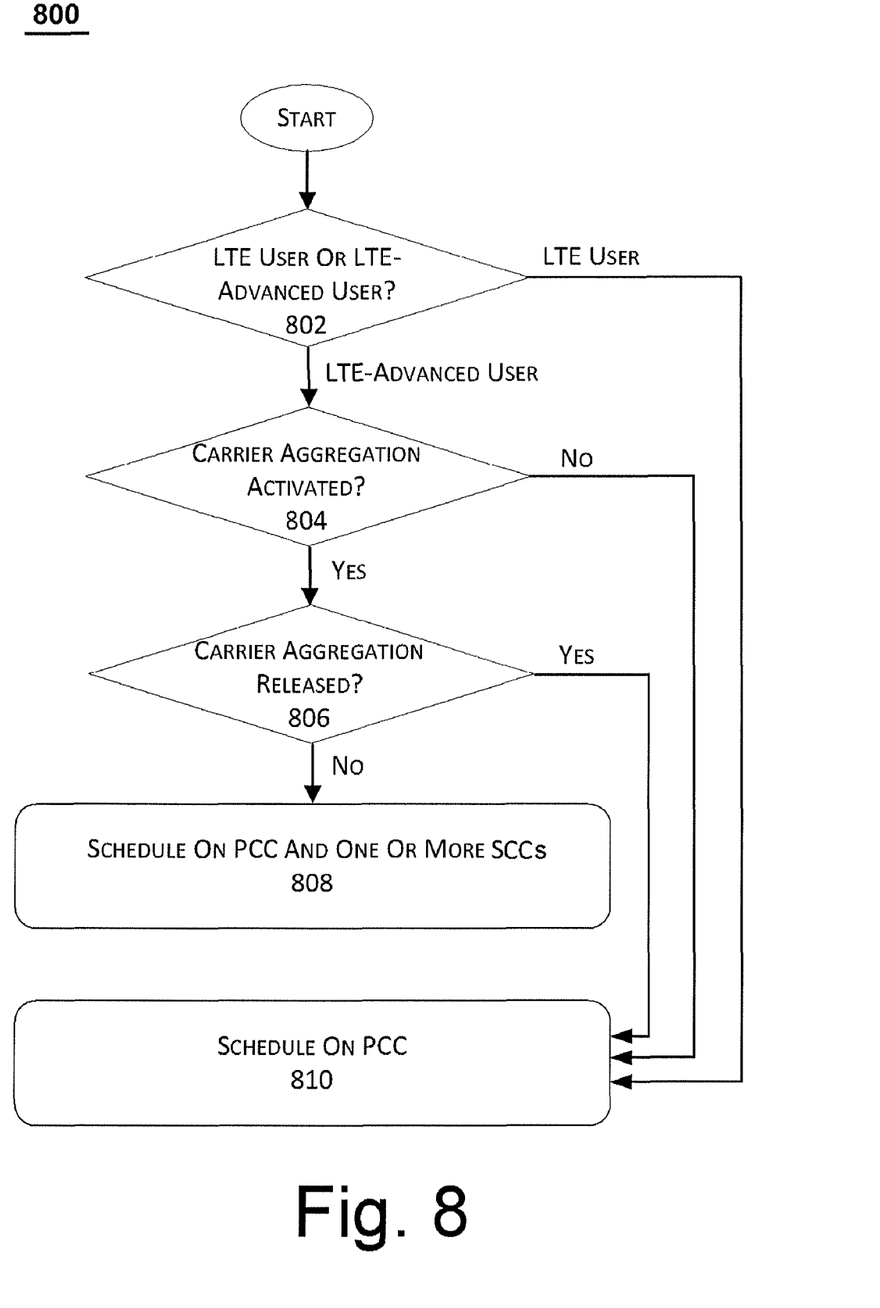
FIG. 8 shows a processing flow of activation and release of carrier aggregation.

FIG. 8 shows a processing flow 800 of activation and release of carrier aggregation. Processing flow includes decision branches 802, 804, 806, and blocks 808, and 810.

At decision branch 802, a determination is made as to whether a user is an LTE user or an LTE-Advanced user. If "LTE user," processing flow 800 proceeds to block 810; if "LTE-Advanced user," processing flow 800 proceeds to decision branch 804.

At block 810, i.e., the user is an LTE user, the user schedules transmission of data packets on the PCC in compliance with the LTE standard.

At decision branch 804, i.e., the user is an LTE-Advanced user, a decision is made as to whether or not carrier aggregation is activated. If "no," processing flow proceeds to block 810; if "yes," processing flow 800 proceeds to decision branch 806.

At block 810, i.e., carrier aggregation is not activated, the user schedules on the PCC.

At decision branch 806, a determination is made as to whether carrier aggregation is activated but not released. If "no," processing flow proceeds to block 808; if "yes," processing flow 800 proceeds to block 810.

At block 808, i.e., carrier aggregation is not released, the user schedules on the PCC and one or more SCCs (block 808).

At block 810, i.e., the carrier aggregation is released, the user returns to scheduling on the PCC.

However, there may be times when carrier aggregation is not activated, transmission rate requirements of the LTE-Advanced user cannot be satisfied by scheduling on the PCC only. After carrier aggregation is activated, user scheduling information can be found on all the component carriers. However, this would increase channel cost.

SUMMARY

Described herein are systems, apparatuses, methods, and techniques related to dynamic activation and release of carrier aggregation in an LTE-Advanced system.

In at least one aspect, a method may determine a state of wireless communication traffic associated with a base station in an LTE-Advanced system. The method may activate or release one or more secondary component carriers in response to the determining in a manner such that one of the one or more secondary component carriers is activated or released at a time.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are techniques related to dynamic activation and release of carrier aggregation in an LTE-Advanced system. Hereafter, the term "transmission need" refers to the amount of resources, such as frequency and time, required for transmission of data packets. When transmission need of an LTE-Advanced user is large and the user is within coverage of at least one secondary component carrier, carrier aggregation is activated while a certain amount of resource of each component carrier is preserved to support carrier aggregation. This avoids unnecessary activation and waste due to signaling cost. When the primary component carrier of an LTE-Advanced user has sufficient resources to satisfy transmission need of the user or when the user is not within coverage of at least one secondary component carrier, carrier aggregation is released. This minimizes complex measurements and the cost of controlling signals due to multi-carrier scheduling.

Overview

According to the proposed scheme, information from the LTE-Advanced system itself is utilized as a trigger to enable dynamic mechanism of carrier aggregation. In the proposed scheme, downlink or uplink buffer information is used for this objective.

For downlink, buffer information is available to the scheduler of an eNB, alternatively referred to as "base station" herein. When the buffer state of the scheduler reaches a first activation threshold (e.g., 80% buffer depth), it means that the PCC is becoming overloaded and the proposed scheme activates a first SCC. When the buffer state of the scheduler reaches a second activation threshold (e.g., 60% buffer depth), the proposed scheme activates a second SCC. The proposed scheme continues accordingly by activating subsequent SCCs one at a time as the scheduler reaches lower buffer depth, until all SCCs are activated or all user traffic awaiting transmission is loaded.

When the user traffic is less than a particular release threshold on a given SCC (e.g., 20% buffer depth), the proposed scheme releases such SCC. Furthermore, in response to one or more users attached to a given SCC leaving the range (or cell) covered by the base station corresponding to the given SCC or one or more users assigned to the given SCC turning off one or more applications, the traffic on the given SCC decreases correspondingly. Accordingly, the proposed scheme releases the SCCs one by one until no SCC is activated as there is no user attached to the SCCs.

For uplink, a user equipment (e.g., a handset) uses a feedback mechanism to report traffic information, e.g., via a buffer state report (BSR). The proposed scheme operates for uplink in a way similar to what is described above with respect to downlink except that BSR is utilized instead of the buffer information in the eNB.

A few features, and the associated benefits, of the proposed scheme are highlighted below. Firstly, the release and activation of SCCs is implemented one SCC at a time. This feature allows radio resources to be utilized in fine granularity and efficiently. Secondly, the activation threshold for activation of the PCC (e.g., 80% buffer depth) is higher than the activation threshold for activation of the SCCs (e.g., 60% buffer depth). With higher activation threshold for the PCC, activation of SCCs is minimized as much as possible. This feature minimizes signaling overhead. Thirdly, the release threshold for release of a given SCC (e.g., 20% buffer depth) is lower than the activation threshold (e.g., 60% buffer depth) on the same SCC. This feature helps avoid a "Ping-Pong" effect on the dynamic mechanism of carrier aggregation. Fourthly, the thresholds for the SCCs may differ from one SCC to another SCC depending on network operation. This feature provides flexibility in network operation. Moreover, each carrier's buffer information in the base station is utilized for dynamic downlink carrier assignment, and the BSR on each carrier of a user equipment is utilized for dynamic uplink carrier assignment. Furthermore, thresholds with respect to uplink are different from thresholds with respect to downlink. This feature is advantageous in terms of interference avoidance and power consumption.

Exemplary Processes

Figure 1:
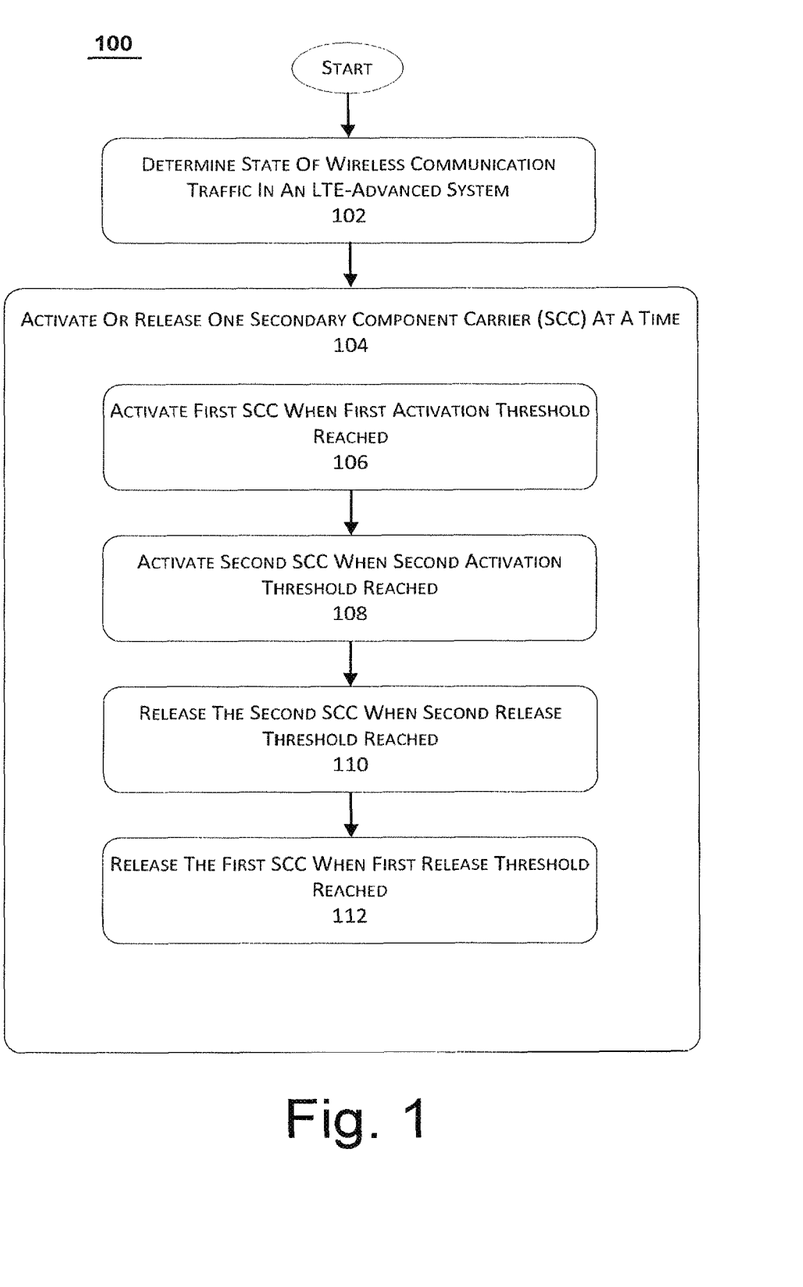
FIG. 1 shows a processing flow in accordance with one or more embodiments of a scheme of activation and release of carrier aggregation in an LTE-Advanced system.

FIG. 1 shows a processing flow 100 in accordance with one or more embodiments of the proposed scheme of activation and release of carrier aggregation in an LTE-Advanced system.

Example processing flow 100 may include one or more operations, actions, or functions as illustrated by one or more of blocks 102, 104, 106, 108, 110 and 112. Although illustrated as discrete blocks, various blocks may be divided into additional blocks, combined into fewer blocks, or eliminated, depending on the desired implementation. Further, processing flow 100 may be implemented in one or more base stations, a central office associated with the one or more base stations, and/or an example computing device 700, to be described below. Processing flow 100 may begin at block 102.

Block 102 (Determine State Of Wireless Communication Traffic In An LTE-Advanced System) may include determining, e.g., by a base station, a state of wireless communication traffic associated with the base station in an LTE-Advanced System. For example, for downlink, the base station may determine a state of downlink traffic based on buffer state information in a scheduler of the base station. As another example, for uplink, the base station may determine a state of uplink traffic based on information in a buffer state report received from a user equipment that is in communication with the base station.

Block 104 (Activate Or Release One Secondary Component Carrier (SCC) At A Time) may include activating or releasing, e.g., by the base station, one or more SCCs in response to the determining in a manner such that one of the one or more SCCs is activated or released at a time. For example, rather than activating all or some of a plurality of available SCCs at once, the base station may activate one of the available SCCs at a time. Similarly, rather than releasing some or all of a plurality of activated SCCs at once, the base station may release one of the activated SCCs at a time. Block 104 may include sub-blocks 106-112.

Sub-Block 106 (Activate First SCC When First Activation Threshold Reached) may include activating, e.g., by the base station, a first SCC of the one or more SCCs in response to the base station determining that a first activation threshold related to the state of wireless communication traffic is reached. For example, when the buffer state of the scheduler reaches the first activation threshold (e.g., 80% buffer depth), the base station may activate the first SCC as the PCC may be overloaded or soon will be overloaded. The first activation threshold used to activate the first SCC is lower than a carrier aggregation threshold related to the state of wireless communication traffic. When the carrier aggregation threshold is reached the base station may activate carrier aggregation in accordance with the LTE-Advanced standard.

Sub-Block 108 (Activate Second SCC When Second Activation Threshold Reached) may include activating, e.g., by the base station, a second SCC of the one or more SCCs in response to the base station determining that a second activation threshold related to the state of wireless communication traffic is reached, where the second activation threshold is lower than the first activation threshold. For example, when the buffer state of the scheduler reaches the second activation threshold (e.g., 60% buffer depth), the base station may activate the second SCC to have both the first SCC and the second SCC activated to support the increased traffic, as indicated by the lowering buffer depth of the buffer state of the scheduler.

Sub-Block 110 (Release The Second SCC When Second Release Threshold Reached) may include releasing, e.g., by the base station, the second SCC in response to the base station determining that a second release threshold related to the state of wireless communication traffic is reached, where the second release threshold is lower than the second activation threshold. For example, when the buffer state of the scheduler reaches the second release threshold (e.g., 20% buffer depth), the base station may release the second SCC, so as to have the first SCC activated but not the second SCC. An example scenario would be that, after the first SCC and the second SCC have been activated, the buffer state changes from, say, 10% buffer depth to 20% buffer depth, indicating less traffic waiting to be transmitted. As a result, one of the activated SCCs, e.g., the second SCC, may be released.

Sub-Block 112 (Release The First SCC When First Release Threshold Reached) may include releasing, e.g., by the base station, the first SCC in response to the base station determining that a first release threshold related to the state of wireless communication traffic is reached, where the first release threshold is higher than the second release threshold. For example, when the buffer state of the scheduler reaches the first release threshold (e.g., 50% buffer depth), the base station may further release the first SCC, so as to have no SCC activated since the buffer state indicates the amount of traffic waiting to be transmitted is lessened. This may occur when, for example, one or more user equipment leave the cell associated with the base station, or when one or more users of one or more user equipment utilizing the base station turns off one or more applications requiring wireless communication.

In the following examples, a variable, $\alpha$, is defined and indicates whether the LTE-Advanced user is within the range of one or more SCCs. The value of $\alpha$ may be set to 1 to denote that at least one SCC covers the user's location or that the user is within the coverage of the at least one SCC. The value of $\alpha$ may be set to 0 to denote that no SCC covers the user's location, or that the user is not within the coverage of any SCC. The value of $\alpha$ may be set to 0 to denote that no SCC covers the user's location, or that the user is not within the coverage of any SCC. As component carriers of different channels have different propagation characteristics, transmission distances and propagation ranges under the same transmission power tend to be different for the component carriers. Another variable, $\beta$, is defined as follows:

$$\beta = \frac{L_{add}}{L_{avail}},$$

where $L_{add}$ is a value representative of an amount of resources (e.g., physical resource blocks) required for a user and $L_{avail}$ is a value representative of an amount of resources of the PCC that is available for utilization by the user. Thus, a load requirement on the PCC increases along with the value of $\beta$. When $\beta$ is greater than 1, it denotes that, even if all the remaining resources are provided to the user, the user's transmission needs still cannot be satisfied.

The proposed scheme further defines an activation threshold value, $C_{activate}$, and a release threshold value, $C_{release}$, where $0 < C_{release} < C_{activate} < 1$. For example, the value of $C_{activate}$ may set to 0.6 and the value of $C_{release}$ may be set to 0.3, and these values may be adjusted in various implementation scenarios.

When the product $\alpha \cdot \beta$ of $\alpha$ and $\beta$ satisfies the condition of $\alpha \cdot \beta > C_{activate}$, carrier aggregation is activated. Thus, when carrier aggregation technology is activated, the condition of $\alpha = 1$ is satisfied, i.e., the user is within coverage of at least one SCC. Besides, the condition of $\alpha \cdot \beta > C_{activate}$ also means $\alpha \cdot \beta$ is larger than the activation threshold value such that the user has high load requirement on the PCC to the point the remaining resources of the PCC may or may not be sufficient to satisfy the user's transmission needs. On the one hand, when the remaining resources of the PCC cannot satisfy the user's transmission needs when $\alpha \cdot \beta \leq 1$, the proposed scheme ensures that carrier aggregation will be activated. On the other hand, the proposed scheme also ensures that the PCC has certain remaining resources available for one or more other users so that the PCC is able to support carrier aggregation for the one or more other users. That is, according to the proposed scheme, even when a given component carrier supports a user as the PCC of the user, certain amount of resource of the given component carrier is preserved so that the given component carrier can serve as the SCC of another user under the carrier aggregation technology.

Figure 2:
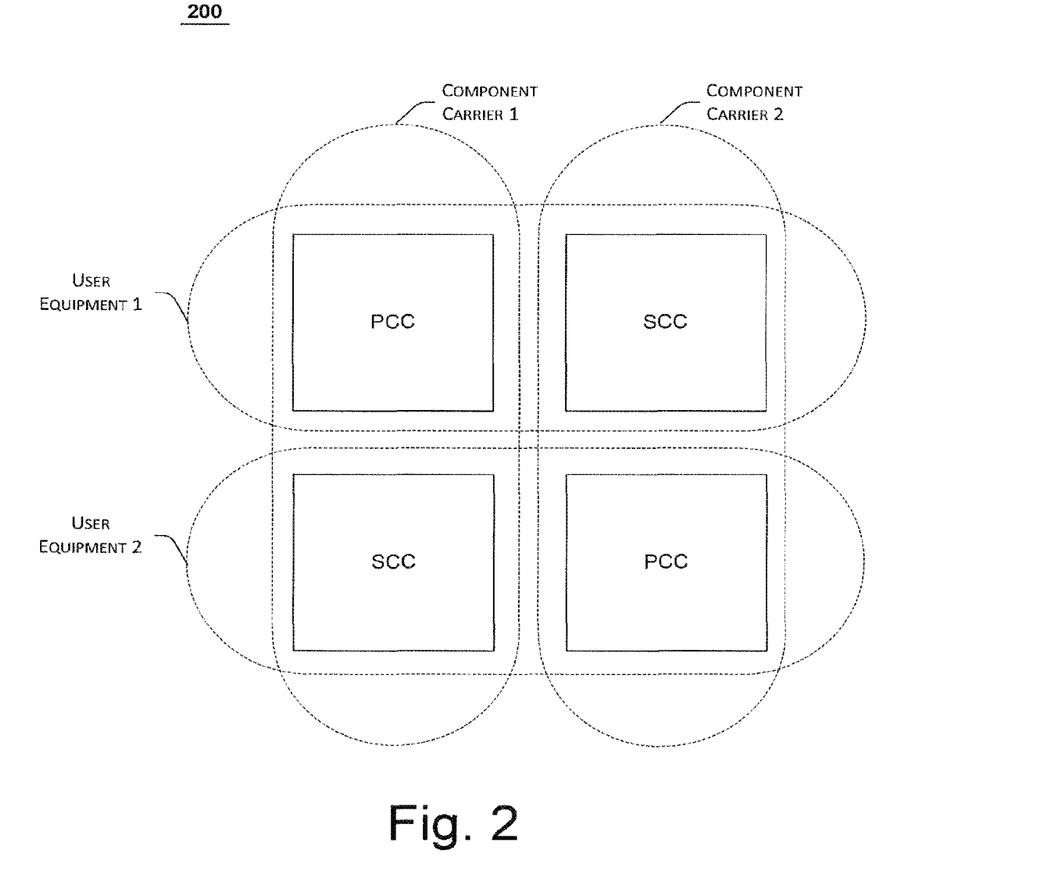
FIG. 2 shows a state diagram in accordance with one or more embodiments of activation of carrier aggregation in an LTE-Advanced system.

FIG. 2 shows a state diagram 200 in accordance with one or more embodiments of the proposed scheme of activation and release of carrier aggregation in an LTE-Advanced system. In the example state diagram 200 shown in FIG. 2, component carrier 1 is the PCC of user equipment 1 as well as the SCC of user equipment 2. Component carrier 2 is the PCC of user equipment 2 as well as the SCC of user equipment 1. Preserved resource of component carrier 1 supports carrier aggregation for user equipment 2. Likewise, preserved resource or component carrier 2 supports carrier aggregation for user equipment 1.

After carrier aggregation is activated, the user is in a multi-carrier scheduling state and requires real-time multi-carrier measurement. However, multi-carrier measurement is complex and the cost of controlling signal is high. Accordingly, the proposed scheme further defines the condition of $\alpha \cdot \beta < C_{release}$, upon the satisfaction of which carrier aggregation is released. When $\alpha \cdot \beta$ is less than a threshold value, e.g., less than $C_{release}$, it denotes that the PCC of a user can satisfy the user's transmission needs and has some resource available, and the user does not need multi-carrier scheduling. Alternatively, when $\alpha=0$, the user is not within the coverage of any SCC and can only be scheduled on the PCC. Therefore, when $\alpha \cdot \beta$ satisfies the condition of $\alpha \cdot \beta < C_{release}$, carrier aggregation is released and the user schedules only on the PCC.

Figure 3:
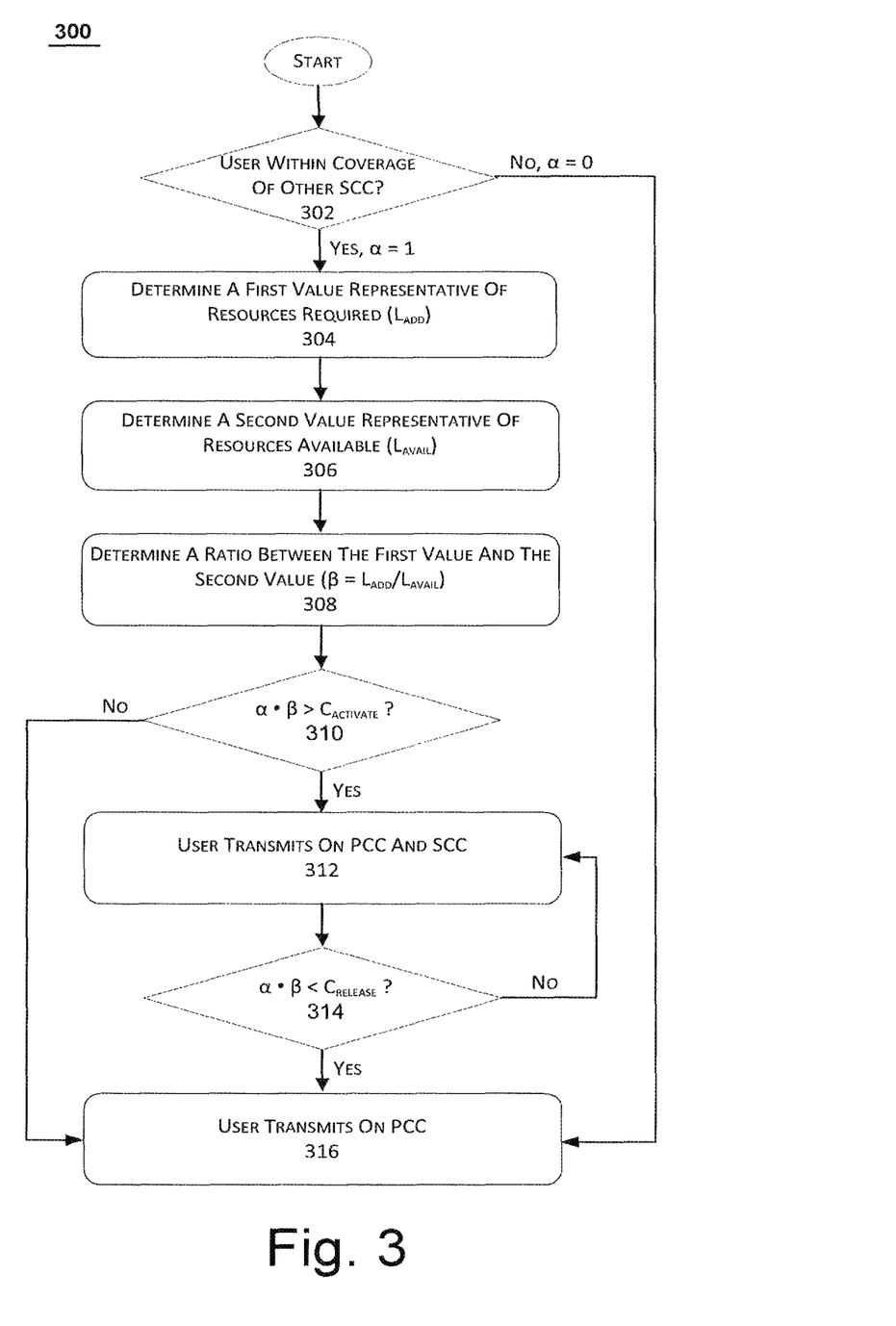
FIG. 3 shows a processing flow in accordance with one or more embodiments of a scheme of activation and release of carrier aggregation in an LTE-Advanced system.

FIG. 3 shows a processing flow 300 in accordance with one or more embodiments of the proposed scheme of activation and release of carrier aggregation in an LTE-Advanced system.

Example processing flow 300 may include one or more operations, actions, or functions as illustrated by one or more of blocks 302, 304, 306, 308, 310, 312, 314 and 316. Although illustrated as discrete blocks, various blocks may be divided into additional blocks, combined into fewer blocks, or eliminated, depending on the desired implementation. Further, processing flow 300 may be implemented in one or more base stations, a central office associated with the one or more base stations, and/or an example computing device 700, to be described below. Processing flow 300 may begin at block 302.

Block 302 (User Within Coverage Of Other SCC?) may include determining, e.g., by a base station, whether any SCC is available for utilization by a first communication device which utilizes a first component carrier as the PCC. For example, if it is determined that at least one SCC is available, then the value of a is set to 1; otherwise, the value of a is set to 0. When $\alpha=0$, the user transmits signals on the PCC as there is no other component carrier available to be utilized by the user as SCC.

Block 304 (Determine A First Value Representative Of Resources Required) may include determining a first value representative of an amount of resources required for the first communication device. For example, the value $L_{add}$ that represents an amount of resources required for a user may be determined.

Block 306 (Determine A Second Value Representative Of Resources Available) may include determining a second value representative of an amount of resources of the first component carrier that is available for utilization by the first communication device. For example, the value Lavail that represents an amount of resources of the PCC that is available for utilization by the user may be determined.

Block 308 (Determine A Ratio Between The First Value And The Second Value) may include determining a ratio between the first value and the second value. For example, the ratio $\beta = L_{add}/L_{avail}$ may be determined.

Block 310 ($\alpha \cdot \beta >$ Cactivate?) may include determining whether the condition of $\alpha \cdot \beta > C_{activate}$ is satisfied. For example, as $C_{activate}$ denotes the activation threshold value, if it is determined that the condition of $\alpha \cdot \beta > C_{activate}$ is satisfied, then carrier aggregation is to be activated. For example, given $C_{activate}=0.6$ and assuming the product $\alpha \cdot \beta$ is greater than 0.6, then carrier aggregation is to be activated.

Block 312 (User Transmits On PCC and SCC) may include the user transmitting signals on the PCC and one or more SCCs available for utilization by the user. For example, after carrier aggregation is activated, one or more component carriers other than the PCC are utilized by the user as SCCs.

Block 314 ($\alpha \cdot \beta < C_{release}$?) may include determining whether the condition of $\alpha \cdot \beta < C_{release}$ is satisfied. For example, as $C_{release}$ denotes the release threshold value, if it is determined that the condition of $\alpha \cdot \beta < C_{release}$ is satisfied, then it indicates that carrier aggregation is to be released. For example, given $C_{release}=0.3$ and assuming the product $\alpha \cdot \beta$ is less than 0.3, then carrier aggregation is to be released.

Block 316 (User Transmits On PCC) may include the user transmitting signals on the PCC and not on any SCC. For example, after carrier aggregation is released, no component carrier other than the PCC is available to be utilized by the user as SCC and, accordingly, the user transmits signals on the PCC.

Figure 4:
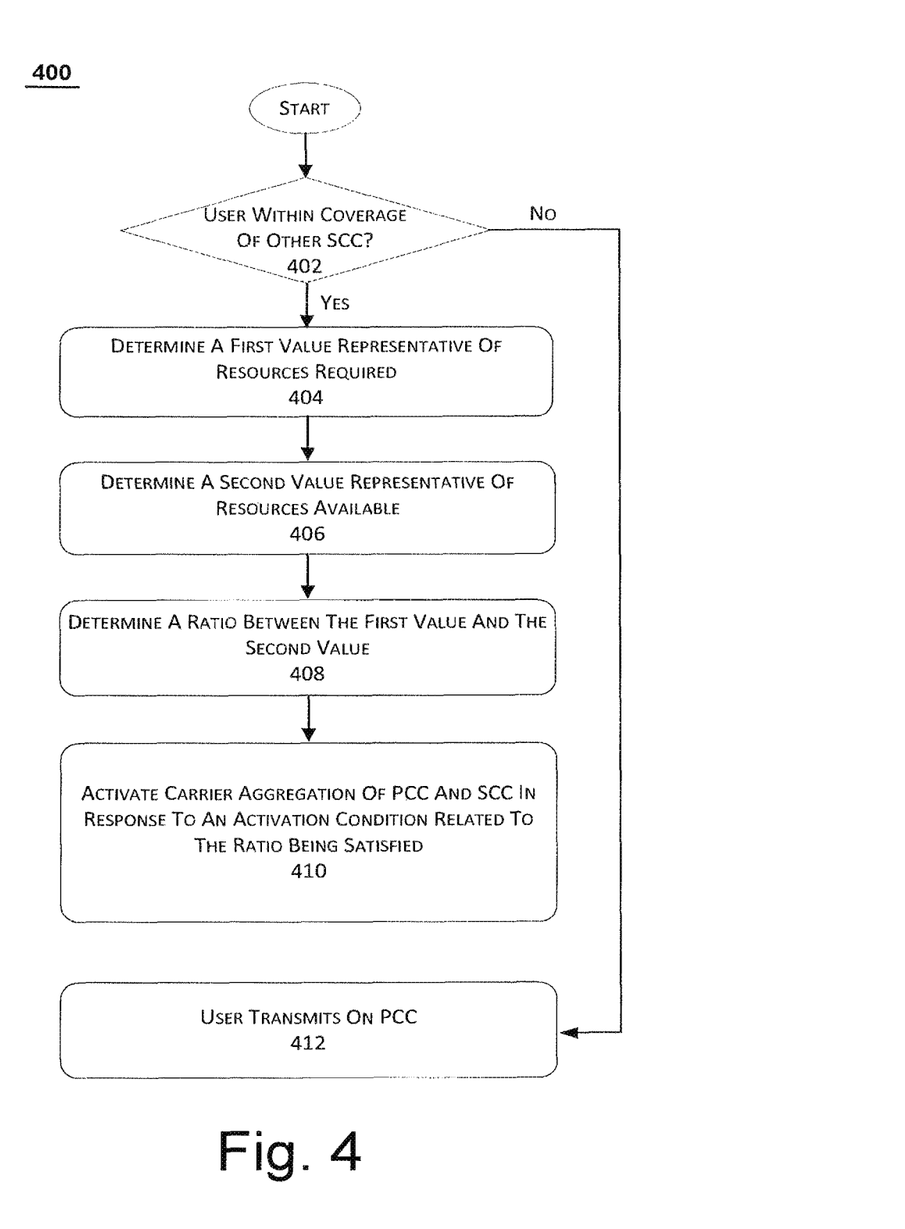
FIG. 4 shows a processing flow in accordance with one or more embodiments of activation of carrier aggregation in an LTE-Advanced system.

FIG. 4 shows a processing flow 400 in accordance with one or more embodiments of activation of carrier aggregation in an LTE-Advanced system.

Example processing flow 400 may include one or more operations, actions, or functions as illustrated by one or more of blocks 402, 404, 406, 408, 410 and 412. Although illustrated as discrete blocks, various blocks may be divided into additional blocks, combined into fewer blocks, or eliminated, depending on the desired implementation. Further, processing flow 400 may be implemented in one or more base stations, a central office associated with the one or more base stations, and/or an example computing device 700. Processing flow 400 may begin at block 402.

Block 402 (User Within Coverage Of Other SCC?) may include determining, e.g., by a base station, whether any SCC is available for utilization by a first communication device which utilizes a first component carrier as the PCC. For example, if it is determined that at least one SCC is available, then the value of a is set to 1; otherwise, the value of a is set to 0. When $\alpha=0$, the first user transmits signals on the PCC as there is no other component carrier available to be utilized by the first user as SCC.

Block 404 (Determine A First Value Representative Of Resources Required) may include determining a first value representative of an amount of resources required for the first communication device. For example, the value $L_{add}$ that represents an amount of resources required for the first user may be determined.

Block 406 (Determine A Second Value Representative Of Resources Available) may include determining a second value representative of an amount of resources of the first component carrier that is available for utilization by the first communication device. For example, the value $L_{avail}$ that represents an amount of resources of the PCC that is available for utilization by the first user may be determined.

Block 408 (Determine A Ratio Between The First Value And The Second Value) may include determining a ratio between the first value and the second value. For example, the ratio $$\beta = \frac{Ladd}{Lavail}$$

may be determined.

Block 410 (Activate Carrier Aggregation Of PCC And SCC In Response To An Activation Condition Related To The Ratio Being Satisfied) may include activating carrier aggregation of the first component carrier and a second component carrier such that a transmission need of the first communication device is satisfied by the first communication device utilizing the first component carrier as the primary component carrier and the second component carrier as a secondary component carrier. The activating is in response to an activation condition related to the ratio between the first value and the second value being satisfied. For example, as $C_{activate}$ denotes the activation threshold value, if it is determined that the condition of $\alpha \cdot \beta > C_{activate}$ is satisfied, then it indicates that carrier aggregation is to be activated. For example, given $C_{activate}=0.6$ and assuming the product $\alpha \cdot \beta$ is greater than 0.6, then carrier aggregation is to be activated.

Block 412 (User Transmits On PCC) may include the first user transmitting signals on the PCC and not on any SCC. For example, when no component carrier other than the PCC is available to be utilized by the first user as SCC, the first user transmits signals on the PCC.

In at least some embodiments, the activation condition may include: (1) the second component carrier being available for utilization by the first communication device, and (2) the ratio between the first value and the second value being greater than an activation threshold value. For example, when $\alpha=1$, indicating that there is at least one component carrier available to be utilized by the first user as the SCC (e.g., the first user is within coverage of the component carrier), and when $\beta > C_{activate}$, the activation condition is satisfied.

In at least some embodiments, the processing flow 400 may also include one or more of the following operations: (1) scheduling resources of the first component carrier and the second component carrier for utilization by the first communication device; (2) updating the first value in response to a change in the amount of resources required for the first communication device; (3) updating the second value in response to a change in the amount of resources of the first component carrier that is available for utilization by the first communication device; and (4) updating the ratio between the first value and the second value in response to either or both of the first value and the second value being updated. For example, after carrier aggregation is activated, resources of the PCC and one or more SCCs are scheduled for utilization by a first user. As transmission needs of the first user change, the value $L_{add}$ is updated to reflect the change. Also, as the PCC and the one or more SCCs may be utilized by other users, the amount of available resources for utilization by the first user, represented by the value $L_{avail}$, may change. Accordingly, the ratio $$\beta = \frac{Ladd}{Lavail}$$

is updated to reflect the change in either or both of $L_{add}$ and $L_{avail}$.

In at least some embodiments, the processing flow 400 may additionally include releasing the carrier aggregation such that the transmission need of the first communication device is satisfied by the first communication device utilizing the first component carrier, and the releasing may be in response to a release condition related to the ratio between the first value and the second value being satisfied. For example, as either or both of $L_{add}$ and $L_{avail}$ may change over time, the value of $\beta$ as well as the product $\alpha \cdot \beta$ may change accordingly to result in the condition of $\alpha \cdot \beta < C_{release}$ being satisfied. As the condition of $\alpha \cdot \beta < C_{release}$ is satisfied, carrier aggregation is released. In at least some embodiments, the release condition may include: (1) neither the second component carrier nor any other component carrier other than the first component carrier being available for utilization by the first communication device, or (2) the ratio between the first value and the second value being lower than a release threshold value which is lower than the activation threshold value. For example, to satisfy the condition of $\alpha \cdot \beta < C_{release}$, either that $\alpha=1$ is no longer true (i.e., $\alpha=0$) or that $\beta < C_{release}$ is true.

In at least some embodiments, the processing flow 400 may further include selectively adjusting either or both of the activation threshold value and the release threshold value in response to a change in demands for resources, resource availability, or both. For example, either or both of the activation threshold value, $C_{activate}$, and the release threshold value, $C_{release}$, may be adjusted to reflect a change in demands for resources, resource availability, or both.

In at least some embodiments, the processing flow 400 may also include preserving an amount of available resources of the first component carrier from utilization by the first communication device such that the first component carrier serves as a secondary component carrier for a second communication device with the second communication device utilizing the reserved amount of available resources of the first component carrier. For example, even when component carrier 1 of FIG. 2 is utilized as the PCC for user equipment 1, a certain amount of resources of component carrier 1 is preserved so that component carrier 1 may be utilized by at least component carrier 2 as the SCC for component carrier 2.

Figure 5:
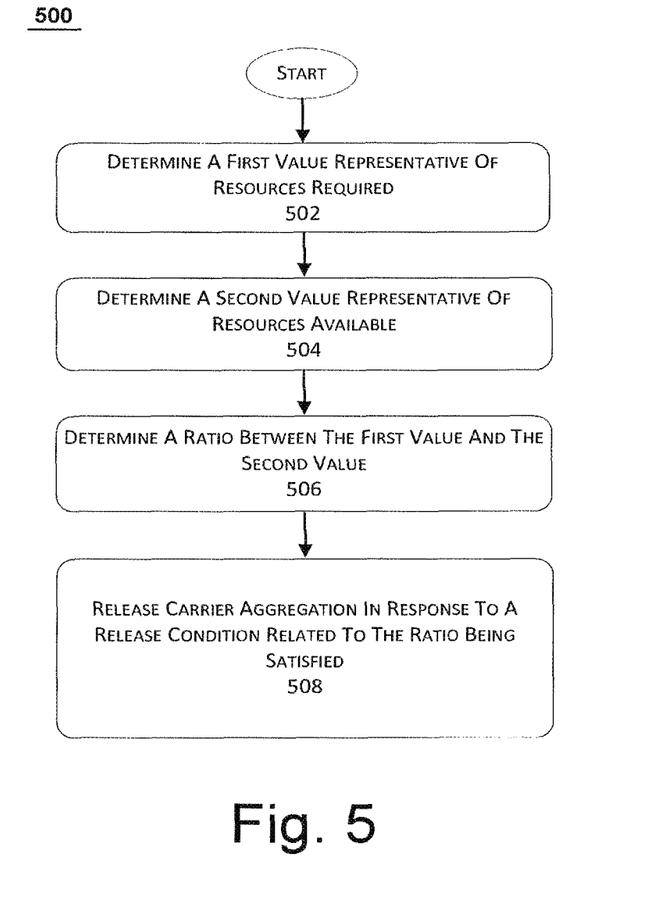
FIG. 5 shows a processing flow in accordance with one or more embodiments of release of carrier aggregation in an LTE-Advanced system.

FIG. 5 shows a processing flow 500 in accordance with one or more embodiments of release of carrier aggregation in an LTE-Advanced system. Example processing flow 500 may include one or more operations, actions, or functions as illustrated by one or more of blocks 502, 504, 506 and 508. Although illustrated as discrete blocks, various blocks may be divided into additional blocks, combined into fewer blocks, or eliminated, depending on the desired implementation. Further, processing flow 500 may be implemented in one or more base stations, a central office associated with the one or more base stations, and/or an example computing device 700. Processing flow 500 may begin at block 502.

Block 502 (Determine A First Value Representative Of Resources Required) may include determining, e.g., by a base station, a first value representative of an amount of resources required for a first communication device which is utilizing a first component carrier as a primary component carrier and a second component carrier as a secondary component carrier. For example, the value $L_{add}$ that represents an amount of resources required for the first user may be determined.

Block 504 (Determine A Second Value Representative Of Resources Available) may include determining a second value representative of an amount of resources of the first component carrier that is available for utilization by the first communication device. For example, the value $L_{avail}$ that represents an amount of resources of the PCC that is available for utilization by the first user may be determined.

Block 506 (Determine A Ratio Between The First Value And The Second Value) may include determining a ratio between the first value and the second value. For example, the ratio $$\beta = \frac{Ladd}{Lavail}$$

may be determined.

Block 508 (Release Carrier Aggregation In Response To A Release Condition Related To The Ratio Being Satisfied) may include releasing carrier aggregation of the first component carrier and the second component carrier such that a transmission need of the first communication device is satisfied by the first communication device utilizing the first component carrier. The releasing is in response to a release condition related to the ratio between the first value and the second value being satisfied. For example, as $C_{release}$ denotes the release threshold value, if it is determined that the condition of $\alpha \cdot \beta < C_{release}$ is satisfied, then it indicates that carrier aggregation is to be released. For example, given $C_{release} = 0.3$ and assuming the product $\alpha \cdot \beta$ is less than 0.3, then carrier aggregation is to be released. As another example, as either or both of $L_{add}$ and $L_{avail}$ may change over time, the value of $\beta$ as well as the product $\alpha \cdot \beta$ may change accordingly to result in the condition of $\alpha \cdot \beta < C_{release}$ being satisfied. As the condition of $\alpha \cdot \beta < C_{release}$ is satisfied, carrier aggregation is released.

In at least some embodiments, the release condition may include: (1) neither the second component carrier nor any other component carrier other than the first component carrier being available for utilization by the first communication device, or (2) the ratio between the first value and the second value being lower than a release threshold value. For example, to satisfy the condition of $\alpha \cdot \beta < C_{release}$, either that $\alpha = 1$ is no longer true (i.e., $\alpha = 0$) or that $\beta < C_{release}$ is true.

In at least some embodiments, the processing flow 500 may also include one or more of the following operations: (1) scheduling resources of the first component carrier for utilization by the first communication device; (2) updating the first value in response to a change in the amount of resources required for the first communication device; (3) updating the second value in response to a change in the amount of resources of the first component carrier that is available for utilization by the first communication device; and (4) updating the ratio between the first value and the second value in response to either or both of the first value and the second value being updated. For example, after carrier aggregation is released, resource of the PCC is scheduled for utilization by a first user. As transmission needs of the first user change, the value $L_{add}$ is updated to reflect the change. Also, as the PCC and the one or more SCCs may be utilized by other users, the amount of available resources for utilization by the first user, represented by the value $L_{avail}$, may change. Accordingly, the ratio $$\beta = \frac{Ladd}{Lavail}$$

is updated to reflect the change in either or both of $L_{add}$ and $L_{avail}$.

In at least some embodiments, the processing flow 500 may additionally include activating the carrier aggregation of the first component carrier and a third component carrier such that the transmission need of the first communication device is satisfied by the first communication device utilizing the first component carrier as the primary component carrier and the third component carrier as a secondary component carrier. The activating may be in response to an activation condition related to the ratio between the first value and the second value being satisfied. For example, as either or both of $L_{add}$ and $L_{avail}$ may change over time, the value of $\beta$ as well as the product $\alpha \cdot \beta$ may change accordingly to result in the condition of $\alpha \cdot \beta > C_{activate}$ being satisfied. This indicates that carrier aggregation is to be activated. For example, given $C_{activate} = 0.6$ and assuming the product $\alpha \cdot \beta$ is greater than 0.6, then carrier aggregation is to be activated. Consequently, the first user may utilize the first component carrier as the PCC and the third component carrier as the SCC.

In at least some embodiments, the activation condition may include: (1) the third component carrier being available for utilization by the first communication device, and (2) the ratio between the first value and the second value being greater than an activation threshold value which is greater than the release threshold value. For example, to satisfy the condition of $\alpha \cdot \beta > C_{activate}$, either that $\alpha = 0$ is no longer true (i.e., $\alpha = 1$) or that $\beta > C_{activate}$ is true.

In at least some embodiments, the processing flow 500 may further include selectively adjusting either or both of the activation threshold value and the release threshold value in response to a change in demands for resources, resource availability, or both. For example, either or both of the activation threshold value, $C_{activate}$, and the release threshold value, $C_{release}$, may be adjusted to reflect a change in demands for resources, resource availability, or both.

In at least some embodiments, the processing flow 500 may also include preserving an amount of available resources of the first component carrier from utilization by the first communication device such that the first component carrier serves as a secondary component carrier for a second communication device with the second communication device utilizing the reserved amount of available resources of the first component carrier. For example, even when component carrier 1 of FIG. 2 is utilized as the PCC for user equipment 1, a certain amount of resources of component carrier 1 is preserved so that component carrier 1 may be utilized by at least component carrier 2 as the SCC for component carrier 2.

Figure 6:
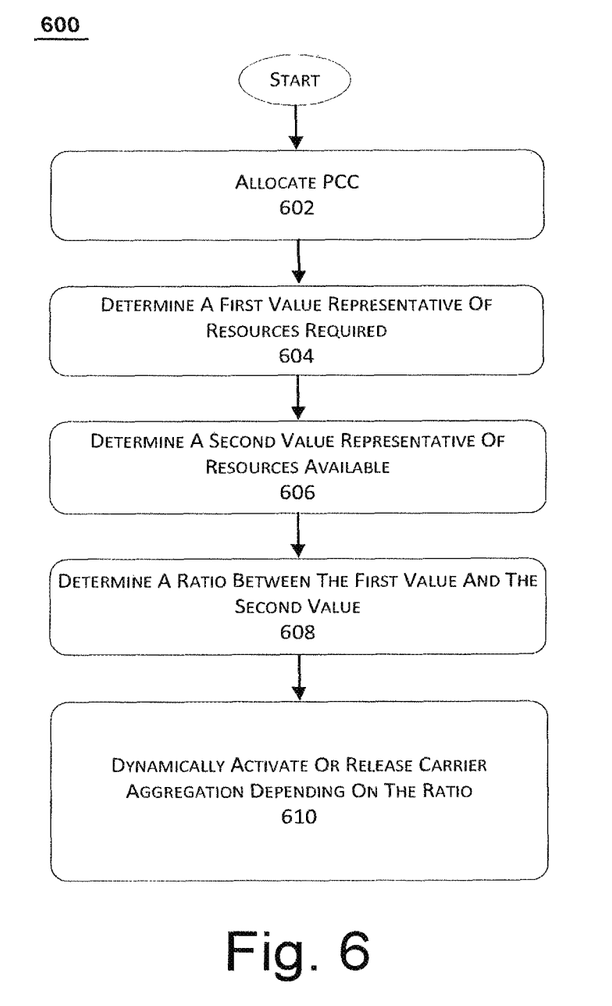
FIG. 6 shows another processing flow in accordance with one or more embodiments of a scheme of activation and release of the carrier aggregation in an LTE-Advanced system.

FIG. 6 shows another processing flow 600 in accordance with one or more embodiments of dynamic activation and release of carrier aggregation in an LTE-Advanced system. Example processing flow 600 may include one or more operations, actions, or functions as illustrated by one or more of blocks 602, 604, 606, 608 and 610. Although illustrated as discrete blocks, various blocks may be divided into additional blocks, combined into fewer blocks, or eliminated, depending on the desired implementation. Further, processing flow 600 may be implemented in one or more base stations, a central office associated with the one or more base stations, and/or an example computing device 700. Processing flow 600 may begin at block 602.

Block 602 (Allocate PCC) may include allocating a first component carrier for utilization by a first communication device as a primary carrier component. For example, with reference to FIG. 2, component carrier 1 may be utilized by user equipment 1 as the PCC for user equipment 1.

Block 604 (Determine A First Value Representative Of Resources Required) may include determining, e.g., by a base station, a first value representative of an amount of resources required for the first communication device. For example, the value $L_{add}$ that represents an amount of resources required for the first user may be determined.

Block 606 (Determine A Second Value Representative Of Resources Available) may include determining a second value representative of an amount of resources of the first component carrier that is available for utilization by the first communication device. For example, the value $L_{avail}$ that represents an amount of resources of the PCC that is available for utilization by the first user may be determined.

Block 608 (Determine A Ratio Between The First Value And The Second Value) may include determining a ratio between the first value and the second value. For example, the ratio $$\beta = \frac{L_{add}}{L_{avail}}$$

may be determined.

Block 610 (Dynamically Activate Or Release Carrier Aggregation Depending On The Ratio) may include dynamically activating or releasing carrier aggregation with respect to the first component carrier and a second component carrier for utilization by the first communication device, the activating or releasing being in response to a respective condition related to the first value and the second value. For example, as $C_{activate}$ denotes the activation threshold value and $C_{release}$ denotes the release threshold value, carrier aggregation may be dynamically activated and released over time depending on whether the condition of $\alpha \cdot \beta > C_{activate}$ or the condition of $\alpha \cdot \beta < C_{release}$ is satisfied, where the value of a depends on whether the user is within coverage of at least one SCC and the value of β depends on changes in the values of $L_{add}$ and $L_{avail}$.

The dynamic activation and release of carrier aggregation as described herein measures the load state of the PCC and triggers the activation or release of carrier aggregation depending on whether an activation threshold condition or a release threshold condition is satisfied, respectively. Accordingly, as multi-carrier load measurement is not necessary, signal scheduling cost is reduced while user transmission needs are satisfied.

Exemplary Computing Device

Figure 7:
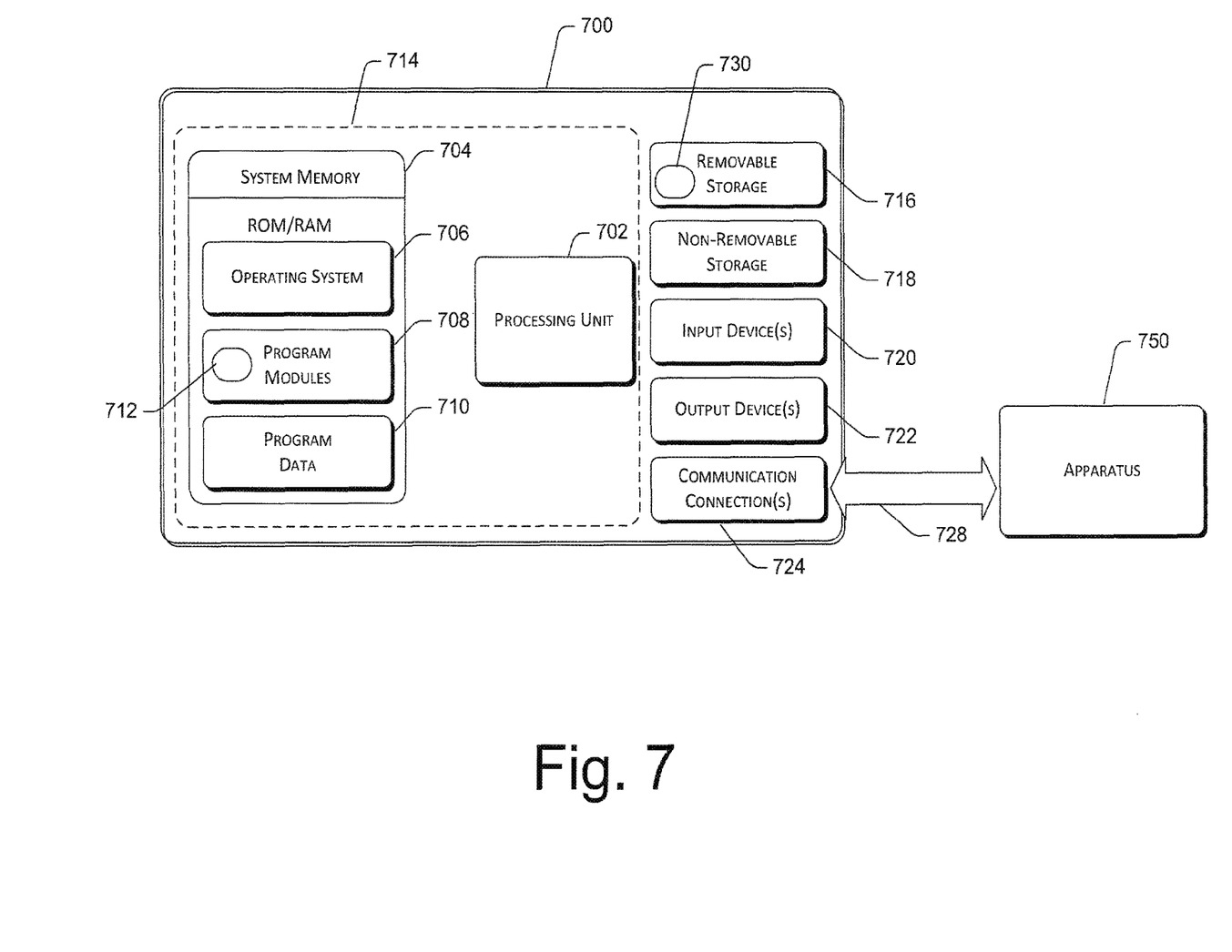
FIG. 7 shows an example computing device that is configured to implement operations of one or more embodiments of activation and release of carrier aggregation in an LTE-Advanced system.

FIG. 7 shows an example computing device 700 that is configured to implement operations of one or more embodiments of dynamic activation and release of carrier aggregation in an LTE-Advanced system.

It will be readily appreciated that the techniques disclosed herein may be implemented in other computing devices, systems, and environments. The computing device 700 shown in FIG. 7 is one example of a computing device and is not intended to suggest any limitation as to the scope of use or functionality of the computer and network architectures.

In at least one implementation, computing device 700 typically includes at least one processing unit 702 and system memory 704. Depending on the exact configuration and type of computing device, system memory 704 may be volatile (such as RAM), non-volatile (such as ROM, flash memory, etc.) or some combination thereof. System memory 704 may include an operating system 706, one or more program modules 708, and may include program data 710. A basic implementation of the computing device 700 is demarcated by a dashed line 714. In at least one embodiment, computing device 700 may be a part of a base station and/or a central office associated with the base station where the proposed scheme of dynamic activation and release of carrier aggregation in an LTE-Advanced system is implemented. In at least another embodiment, computing device 700 may be a computing device that is communicatively coupled to the base station and/or a central office associated with the base station.

The program module 708 may include a module 712 configured to implement the dynamic activation and release of carrier aggregation in an LTE-Advanced system as described above. For example, the module 712 include a set of computer-executable instructions or program codes that, when executed by the processing unit 702, may cause the processing unit 702 to carry out processing flows 100, 300, 400, 500 and/or 600 and any variations thereof, e.g., the computing device 700 performing the operations as described above with respect to processing flows 100, 300, 400, 500 and/or 600.

Computing device 700 may have additional features or functionality. For example, computing device 700 may also include additional data storage devices such as removable storage 716 and non-removable storage 718. In at least some implementations, the removable storage 716 and non-removable storage 718 are an example of computer accessible media for storing computer-executable instructions or program codes that are executable by the processing unit 702 to perform the various functions described above. Generally, any of the functions described with reference to the figures can be implemented using software, firmware, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 700. Any of such computer accessible media may be part of the computing device 700.

In one implementation, the removable storage 716, which is a computer accessible medium, has a set of computer-executable instructions 730 stored thereon. When executed by the processing unit 702, the set of computer-executable instructions 730 cause the processing unit 702 to execute operations, tasks, functions and/or methods as described above, including processing flows 100, 300, 400 and/or 500 and any variations thereof.

Computing device 700 may also include one or more input devices 720 such as keyboard, mouse, pen, voice input device, touch input device, etc. Computing device 700 may additionally include one or more output devices 722 such as a display, speakers, printer, etc.

Computing device 700 may also include one or more communication connections 724 that allow the computing device 700 to communicate with apparatus 750 over network connection 728. Apparatus 750 may be a base station or a central office associated with the base station. In such case, computing device 700 may be a computing device used by an operator to control operations of the base station or a central office associated with the base station.

Upon executing the set of computer-executable instructions, whether stored in module 712 of program module 708 or in removable storage 716, processing unit 702 may direct computing device 700 or apparatus 750 to carry out a number of operations to implement the dynamic activation and release of carrier aggregation in an LTE-Advanced system as described above, including processing flows 100, 300, 400, 500 and/or 600 and any variations thereof.

It is appreciated that the illustrated computing device 700 is one example of a suitable device and is not intended to suggest any limitation as to the scope of use or functionality of the various embodiments described.

Additional and Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

I claim:

1. A method, comprising:
    determining a state of wireless communication traffic associated with a base station in a long term evolution advanced (LTE advanced) system;
    determining whether a first activation threshold related to the state of the wireless communication traffic is reached;
    in response to a determination that the first activation threshold related to the state of the wireless communication traffic is reached, activating a first secondary component carrier of one or more secondary component carriers;
    determining whether a second activation threshold related to the state of the wireless communication traffic is reached, wherein the second activation threshold is lower than the first activation threshold; and
    in response to a determination that the second activation threshold related to the state of the wireless communication traffic is reached, activating a second secondary component carrier of the one or more secondary component carriers.

2. The method of claim 1, wherein the determining the state of the wireless communication traffic comprises determining a state of downlink traffic based on buffer state information in a scheduler of the base station.

3. The method of claim 1, wherein the determining the state of the wireless communication traffic comprises determining a state of uplink traffic based on information in a buffer state report from a user equipment.

4. The method of claim 1, wherein the first activation threshold is lower than a carrier aggregation threshold related to the state of the wireless communication traffic, and wherein carrier aggregation is activated after the carrier aggregation threshold is reached.

5. The method of claim 1, further comprising:
    releasing the second secondary component carrier in response to a determination that a second release threshold related to the state of the wireless communication traffic is reached, wherein the second release threshold is lower than the second activation threshold.

6. The method of claim 5, further comprising:
    releasing the first secondary component carrier in response to a determination that a first release threshold related to the state of the wireless communication traffic is reached, wherein the first release threshold is higher than the second release threshold.

7. An apparatus, comprising:
    a memory having a set of processor-executable instructions stored thereon; and
    at least one processor coupled to the memory, wherein the set of processor-executable instructions, in response to execution by the at least one processor, cause the at least one processor to perform or control performance of operations that comprise:
        determine a state of wireless communication traffic associated with a base station in a long term evolution advanced (LTE advanced) system;

determine whether a first activation threshold related to the state of the wireless communication traffic is reached;

in response to a determination that the first activation threshold related to the state of the wireless communication traffic is reached, activate a first secondary component carrier of one or more secondary component carriers;

determine whether a second activation threshold related to the state of the wireless communication traffic is reached, wherein the second activation threshold is lower than the first activation threshold; and in response to a determination that the second activation threshold related to the state of the wireless communication traffic is reached, activate a second secondary component carrier of the one or more secondary component carriers.

8. The apparatus of claim 7, wherein to determine the state of the wireless communication traffic, the operations comprise:

determine a state of downlink traffic based on buffer state information in a scheduler of the base station.

9. The apparatus of claim 7, wherein to determine the state of the wireless communication traffic, the operations comprise:

determine a state of uplink traffic based on information in a buffer state report from a user equipment that is in communication with the base station.

10. The apparatus of claim 7, wherein the first activation threshold is lower than a carrier aggregation threshold related to the state of the wireless communication traffic, and wherein carrier aggregation is activated after the carrier aggregation threshold is reached.

11. The apparatus of claim 7, wherein the operations further comprise:

release the second secondary component carrier in response to a determination that a second release threshold related to the state of the wireless communication traffic is reached, wherein the second release threshold is lower than the second activation threshold.

12. The apparatus of claim 11, wherein the operations further comprise:

release the first secondary component carrier in response to a determination that a first release threshold related to the state of the wireless communication traffic is reached, wherein the first release threshold is higher than the second release threshold.

13. A non-transitory computer readable medium having instructions stored thereon that, in response to execution, cause one or more processors to perform or control performance of operations that comprise:

determine a state of wireless communication traffic associated with a base station in a long term evolution advanced (LTE advanced) system; and in response to the determination, activate or release one or more secondary component carriers wherein the operations to activate or release the one or more secondary component carriers comprise at least one operation to:

activate a secondary component carrier of the one or more secondary component carriers, in response to a determination that an activation threshold related to the state of the wireless communication traffic is reached; and release the secondary component carrier of the one or more secondary component carriers, in response to a determination that a release threshold related to the state of the wireless communication traffic is reached, wherein the release threshold is lower than the activation threshold.

14. The non-transitory computer readable medium of claim 13, wherein the activation threshold is lower than a carrier aggregation threshold related to the state of the wireless communication traffic, and wherein carrier aggregation is activated after the carrier aggregation threshold is reached.

15. A method, comprising:

determining a state of wireless communication traffic associated with a base station in a long term evolution advanced (LTE-advanced) system;

activating a first secondary component carrier of one or more secondary component carriers in response to a determination that a first activation threshold related to the state of the wireless communication traffic is reached;

activating a second secondary component carrier of the one or more secondary component carriers in response to a determination that a second activation threshold related to the state of the wireless communication traffic is reached, wherein the second activation threshold is lower than the first activation threshold;

releasing the second secondary component carrier in response to a determination that a second release threshold related to the state of the wireless communication traffic is reached, wherein the second release threshold is lower than the second activation threshold; and releasing the first secondary component carrier in response to a determination that a first release threshold related to the state of the wireless communication traffic is reached, wherein the first release threshold is higher than the second release threshold.

16. The method of claim 15, wherein the first activation threshold is lower than a carrier aggregation threshold related to the state of the wireless communication traffic, and wherein carrier aggregation is activated after the carrier aggregation threshold is reached.

* * * * *